United States Patent Office 2,902,491
Patented Sept. 1, 1959

2,902,491
N-(PIPERIDYL-2-ETHYL)-N-(MERCAPTOPHENYL)-ANILINES

Arthur Stoll, Arlesheim, near Basel, and Jean Pierre Bourquin and Jany Renz, Basel, Switzerland, assignors to Sandoz Ltd. (also known as Sandoz A.G.), Basel, Switzerland, a Swiss firm No Drawing. Application June 30, 1958
Serial No. 745,314

Claims priority, application Switzerland July 19, 1957

8 Claims. (Cl. 260—293.4)

The present invention relates to diphenylamine derivatives which are substituted by a mercapto group in one phenyl nucleus and which correspond to formula

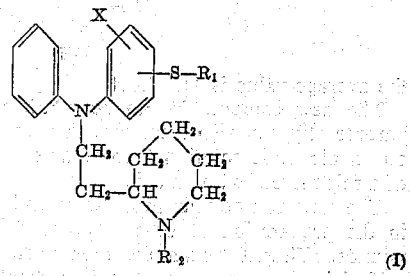

wherein $R_1$ is (a) an alkyl group, preferably an alkyl group where 1 to 6 carbon atoms (e.g. methyl, ethyl, n-propyl, isopropyl, n-butyl, n-amyl, n-hexyl, or (b) an aryl group (e.g. phenyl), or (c) an aralkyl group (e.g. benzyl), $R_2$ is a hydrogen atom or a lower alkyl group (e.g. ethyl, propyl, butyl, etc. and preferably methyl), the mercapto group ($-S-R_1$) is in the m- or o-position of the said phenyl nucleus, and X is H or Cl.

The new compounds of this invention which, as will hereinafter appear, are pharmacodynamically active, can conveniently be prepared by condensing a secondary amine of the formula

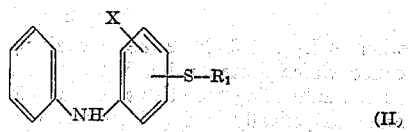

wherein X and $R_1$ are as previously defined; and the $-S-R_1$ group is in the meta- or ortho-position to the $-NH-$ group, with a piperidine derivative of the formula

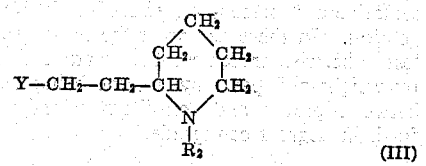

wherein $R_2$ is as previously defined, and Y is a chlorine, bromine or iodine atom.

The process may be carried out, for example, by dissolving a secondary amine of Formula II in an appropriate solvent, such as benzene, toluene, xylene, etc., and reacting it—while stirring and with the addition of a suitable condensing agent, such for example as alkali metal hydroxide, alkali metal amide, alkali metal carbonate or copper powder—with a piperidine halide of Formula III at room temperature (about 20° to about 30° C.) or at elevated temperature. Upon completion of the reaction, the reaction product is recovered by working up the reaction mixture and distilling under reduced pressure.

The thus-obtained compounds are oily or crystalline at room temperature, and form stable solid salts with acids. Thus, they form salts with a wide variety of therapeutically applicable acids, forming for instance hydrochloride, hydrobromide, tartrate, gluconate, malonate, maleate salts, etc., with hydrochloric acid, hydrobromic acid, tartaric acid, gluconic acid, malonic acid, maleic acid, etc., respectively, as well as further salts with other organic or inorganic acids. The reaction product I, supra, may be purified, if desired, by conversion into a salt thereof and then recovering the free base from such salt.

The said compounds and their salts possess pharmacodynamic properties which render them valuable for a variety of therapeutic and other purposes.

It is well known that skin infection due to mold fungus—especially its commonest form, interdigital mycosis of the foot—is widespread. About 20% of the six- to seven-year olds, and more than 80% of those between the ages of 17 to 19, are afflicted therewith. Many commercial fungicides are used against these dermatomycoses or epidermophytons. Thereapeutic success has, however, been only so slight with these fungicides, that the development of an intensively acting, fungicidal preparation which is not toxic to the patient in therapeutic doses, is an urgent need of modern therapy. This need is supplied by the present invention, the new diphenylamine compounds of which have a strong fungicidal action coupled with low toxicity and concomitant good tolerability. The action of the new compounds on, for example, *Candida albicans*, the causative factor in most epidermophytoses, is greatly superior to that of any known fungicide.

A preferred sub-group of the compounds of the present invention is constituted by those which correspond to Formula I, supra, and wherein the $R_1$ group contains more than 3 carbon atoms, i.e. at least 4 carbon atoms. All these compounds are characterized by total inhibitory action at a concentration of at most 1:72,000 against *Candida albicans*, and by total inhibitory action at a concentration of at most 1:105,000 against *Trichophyton* (e.g. *Trichophyton interdigitale* Kaufmann-Wolf; *Trichophyton rubrum* Castellani; *Trichophyton gypseum asteroides*; *Trichophyton gypseum*; *Trichophyton gallinae*).

The invention also comprises within its scope a sub-group of compounds of the formula

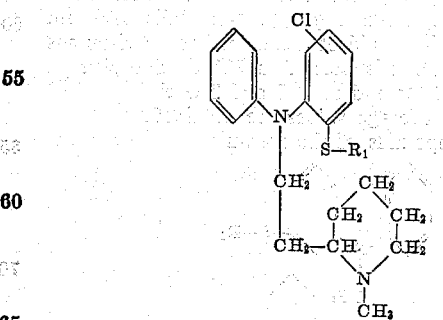

which, especially when $R_1$ is phenyl and Cl is in the paraposition to the $-S-R_1$ group, are also active against the previously-mentioned pathogenic fungi.

The antimycotic activity against *Candida albicans* may for example be determined as follows:

A sterile diluted series of the substance to be tested is prepared in a suitable nutrient solution which is made up from beer-wort, diluted with water (1:8) and containing 1% by weight of glucose (dextrose). 5 milliliters of each solution are inoculated with a drop of a 16-hour old culture of *Candida albicans*, diluted 1:50. The incubation is carried out at 37° C., and the growth observed at the end of 24 hours.

The following average values are obtained:

(a) With compounds of the formula

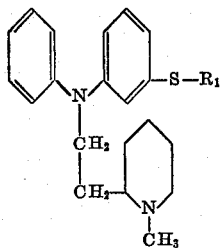

| $R_1$ | Average Total Inhibition Conc'n Limit 1 |
|---|---|
| —$CH_3$ | 6,400 |
| —$C_2H_5$ | 12,500 |
| —$CH(CH_3)_2$ | 37,000 |
| —$CH_2C_6H_5$ | 72,000 |
| —n—$C_3H_7$ | 36,000 |
| —n—$C_4H_9$ | 80,000 |
| —n—$C_5H_{11}$ | 100,000 |
| —n—$C_6H_{13}$ | 100,000 |
| —$C_6H_5$ | 90,000 |

(b) With compounds of the formula

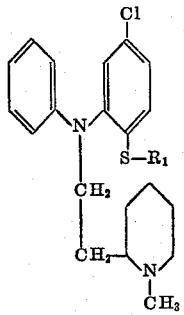

the values are 1:4,000 when $R_1=$ —$CH_3$; 1:72,000 when $R_1=$ —$C_6H_5$.

The antimycotic activity against *Trichophyton* (any of those previously named) may be determined as follows:

The same sterile nutrient solution is used as in the tests with *Candida albicans*. Diluted series of the substances to be tested are again prepared. 5 milliliters of each solution are inoculated with a conidia suspension of the test organism so that $10^5$ conidia are present per 5 milliliters (1 drop=$\frac{1}{20}$ milliliter of a suspension of an agar slant culture, containing $2 \times 10^6$ condidia per milliliter, adjusted with the aid of a standard comparison suspension). Incubation is effected at 22° C., and observations are made at the end of 1, 2 and 3 weeks.

The following average values are obtained:

(a) With compounds of the formula

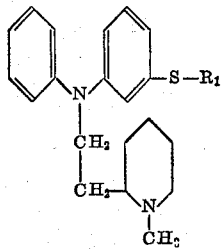

| $R_1$ | Average Total Inhibition Conc'n (average of 5 strains) 1 |
|---|---|
| —$CH_3$ | 12,000 |
| —$C_2H_5$ | 13,000 |
| —$CH(CH_3)_2$ | 69,000 |
| —$CH_2C_6H_5$ | 117,000 |
| —n—$C_3H_7$ | 59,000 |
| —n—$C_4H_9$ | 105,000 |
| —n—$C_5H_{11}$ | 124,000 |
| —n—$C_6H_{13}$ | 136,000 |
| —$C_6H_5$ | 148,000 |

(b) With the compound of the formula

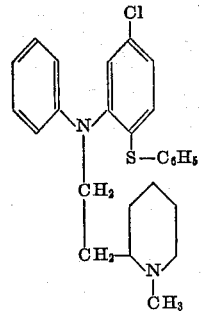

the average value is 1:117,000

The new compounds can be administered per os or parenterally, but also locally, as for example by painting on an alcoholic solution thereof or an aqueous solution of a salt thereof with an acid.

The new compounds are also useful as intermediates in the preparation of other therapeutically active compounds. Thus, for example, upon treatment thereof with sulfurizing agents, such as sulfur dihalides, they yield corresponding phenothiazines, e.g. phenothiazines of the formula

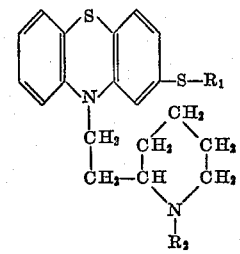

wherein $R_1$ and $R_2$ have the precedingly-indicated significance, which possess valuable therapeutic properties, such as e.g. enhancing the effects of narcotically, hypnotically and analgetically acting pharmaceuticals; these phenothiazine derivatives are therefore useful as pre-narcosis agents, but are also useful in the treatment of allergies, as spasmolytica or as neuroplegica in therapy.

The following illustrative examples set forth representative and presently-preferred embodiments of the invention. In these examples the parts are by weight unless otherwise indicated, the relationship between parts by weight and parts by volume being the same as that between grams and milliliters. Temperatures are set forth in degrees centigrade.

*Example 1*

15 parts of N-(m-methylmercapto-phenyl)-aniline are dissolved in 75 parts by volume of absolute xylene, after which 3.26 parts of finely pulverized sodamide are added and the mixture refluxed for two hours at a bath temperature of 180°. Then, without interrupting the heating, 12.7 parts of 2-(N-methyl-piperidyl-2')-1-chloroethane (B.P. 84° at 10 mm. Hg) dissolved in 12 parts by volume of absolute xylene are added dropwise in the course of 1½ hours, after which the mixture is heated to boiling, with continued stirring, for three more hours. The mixture is then cooled, and excess sodamide is decomposed by the addition of 5 parts of ammonium chloride. The xylene solution is washed three times, each time with 25 parts by volume of water, and is then extracted once with 30 parts by volume of 3-normal acetic acid and then three more times, using 10 parts by volume of the said acid each time. The combined acetic acid extracts are shaken out with 50 parts by volume of ether and are then adjusted to alkalinity to phenolphthalein by means of 16 parts by volume of concentrated aqueous caustic soda solution. The oily base which separates is dissolved in 100 parts by volume of benzene and the obtained solution is shaken out with 30 parts by volume of water, dried over potassium carbonate, filtered, and evaporated under reduced pressure. The residue is distilled under high vacuum, the main fraction going over at 215–218° under a pressure of 0.01 mm. Hg being collected. The obtained pure N-[m-methylmercapto-phenyl]-N-[2-(N'-methyl-piperidyl-2')-ethyl-1]-aniline boils at 216° under a pressure of 0.01 mm. Hg.

The N-(m-methylmercapto-phenyl)-aniline may conveniently be prepared by condensing m-methylmercapto-aniline (B.P. 163–165° at 16 mm. Hg pressure) with the potassium salt of o-chloro-benzoic acid, and decarboxylating the obtained N-(m-methylmercapto-phenyl)-anthranilic acid (M.P. 139–141°) by heating and distilling, yielding the N-(m-methylmercapto-phenyl)-aniline (M.P. 59–61°).

*Example 2*

20.12 parts of N-(m-ethylmercapto-phenyl)-aniline are dissolved in 90 parts by volume of absolute xylene, after which 4.10 parts of finely pulverized sodamide are added and the mixture refluxed for two hours at a bath temperature of 180°. Then, without interrupting the heating, 15.9 parts of 2-(N-methyl-piperidyl-2')-1-chloro-ethane (B.P. 84° at 10 mm. Hg) dissolved in 15 parts by volume of absolute xylene are added dropwise in the course of 1½ hours, after which the mixture is heated to boiling, with continued stirring, for three more hours. The mixture is then cooled, and excess sodamide is decomposed by the addition of 5 parts of ammonium chloride. The xylene solution is washed three times, each time with 30 parts by volume of water, and is then extracted once with 40 parts by volume of 3-normal acetic acid and then three more times, using 15 parts by volume of the said acid each time. The combined acetic acid extracts are shaken out with 50 parts by volume of ether and are then adjusted to alkalinity to phenolphthalein by means of 25 parts by volume of concentrated aqueous caustic soda solution. The oily base which separates is dissolved in 110 parts by volume of benzene and the obtained solution is shaken out with 30 parts by volume of water, dried over potassium carbonate, filtered, and evaporated under reduced pressure. The residue is distilled under high vacuum, the main fraction going over at 205–207° under a pressure of 0.005 mm. Hg being collected. The obtained pure N-[m-ethylmercapto-phenyl]-N-[2-(N'-methyl-piperidyl-2')-ethyl-1]-aniline boils at 206° at 0.005 mm. Hg.

The N-(m-ethylmercapto-phenyl)-aniline may conveniently be prepared by condensing m-ethylmercapto-aniline (B.P. 147–152° at 10 mm. Hg) with the potassium salt of o-chloro-benzoic acid, and decarboxylating the obtained N-(m-ethylmercapto-phenyl)-anthranilic acid (M.P. 114–116°) by heating and distilling, yielding the N-(m-ethylmercaptophenyl)-aniline (B.P. 140° at 0.007 mm. Hg).

*Example 3*

30.0 parts of N-(m-isopropylmercapto-phenyl)-aniline are dissolved in 135 parts by volume of absolute xylene, after which 5.77 parts of finely pulverized sodamide are added and the mixture refluxed for two hours at a bath temperature of 180°. Then, without interrupting the heating, 22.4 parts of 2-(N-methyl-piperidyl-2')-1-chloroethane (B.P. 84° at 10 mm. Hg) dissolved in 25 parts by volume of absolute xylene are added dropwise in the course of 1½ hours, after which the mixture is heated to boiling, with continued stirring, for three more hours. The mixture is then cooled, and excess sodamide is decomposed by the addition of 10 parts of ammonium chloride. The xylene solution is washed three times, each time with 50 parts by volume of water, and is then extracted once with 60 parts by volume of 3-normal acetic acid and then three more times, using 20 parts by volume of the said acid each time. The combined acetic acid extracts are shaken out with 100 parts by volume of ether and are then adjusted to alkalinity to phenolphthalein by means of 30 parts by volume of concentrated aqueous caustic soda solution. The oily base which separates is dissolved in 200 parts by volume of benzene and the obtained solution is shaken out with 60 parts by volume of water, dried over potassium carbonate, filtered, and evaporated under reduced pressure. The residue is distilled under high vacuum, the main fraction going over at 203–205° under a pressure of 0.005 mm. Hg being collected. The obtained pure N-[m-isopropylmercapto-phenyl]-N-[2-N'-methylpiperidyl-2')-ethyl-1]-aniline boils at 204° at 0.005 mm. Hg.

The N-(m-isopropylmercapto-phenyl)-aniline may conveniently be prepared by reducing m-isopropylmercapto-nitrobenzene (B.P. 148–150° at 11 mm. Hg) with stannous chloride or iron shavings and hydrochloric acid to yield m-isopropylmercapto-aniline (B.P. 142–144° at 10 mm. Hg) which is then condensed with potassium o-chloro-benzoate to produce the N-(m-isopropylmercapto-phenyl)-anthranilic acid (M.P. 114–116°). The latter compound is decarboxylated by heating followed by distillation, producing the N-(m-isopropylmercapto-phenyl)-aniline (B.P. 143° at 0.005 mm. Hg).

*Example 4*

25.0 parts of N-(m-benzylmercapto-phenyl)-aniline are dissolved in 120 parts by volume of absolute benzene, after which 4.02 parts of finely pulverized sodamide are added and the mixture refluxed for two hours at a bath temperature of 180°. Then, without interrupting the heating, 15.6 parts of 2-(N-methyl-piperidyl-2')-1-chloro-ethane dissolved in 16 parts by volume of absolute xylene are added dropwise in the course of 1½ hours, after which the mixture is heated to boiling, with continued stirring, for three more hours. The mixture is then cooled, and excess sodamide is decomposed by the addition of 10 parts of ammonium chloride. The xylene solution is washed three times, each time with 50 parts by volume of water, and is then extracted once with 175 parts by volume of 15% by weight aqueous tartaric acid, and then twice more, using 30 parts by volume of the said acid each time. The combined tartaric acid extracts are shaken out with 100 parts by volume of ether and are then adjusted to alkalinity to phenolphthalein by means of 60 parts by volume of concentrated aqueous caustic soda solution. The oily base which separates is dissolved in 200 parts of benzene and the obtained solution is shaken out with 60 parts by volume of water, dried over potassium carbonate, filtered, and evaporated under reduced pressure. The residue is distilled under high vacuum, the principal fraction going over at 214–216° at a pressure of 0.005 mm. Hg being collected. The obtained pure N-[m-benzylmercapto-phenyl]-N-[2-(N'-methyl-piperidyl-2')-ethyl-1]-aniline boils at 215° at 0.005 mm. Hg.

The N-(m-benzylmercapto-phenyl)-aniline is conveniently prepared by condensing m-benzylmercapto-aniline (B.P. 163° at 0.06 mm. Hg) with potassium o-chlorobenzoate, and then decarboxylating the resultant N-(m-benzylmercaptophenyl)-anthranilic acid (M.P. 137–139°) by heating to 250°. The obtained N-(m-benzylmercaptophenyl)-aniline is then distilled in a high vacuum; B.P. 214° at 0.02 mm. Hg; M.P. 61–63°.

*Example 5*

Meta-n-propylmercapto-nitrobenzene (boiling point 163–165° under a pressure of 11 mm. Hg) is reduced by means of stannous chloride and hydrochloric acid to yield the m-n-propylmercapto-aniline (boiling point 154–157° at 11 mm. Hg). The latter is condensed with the potassium salt of o-chlorobenzoic acid, and the so-obtained N-(m-n-propylmercapto-phenyl)-anthranilic acid (melting point 99–101°) is then decarboxylated by heating followed by distillation, whereupon the N-(m-n-propylmercapto-phenyl)-aniline (boiling point 170–172° at 0.01 mm. Hg) is obtained.

30.0 parts of N-(m-n-propylmercapto-phenyl)-aniline are dissolved in 150 parts by volume of absolute xylene, after which 5.8 parts of finely pulverized sodamide are added to the solution which is then heated to boiling under reflux for 2 hours at a bath temperature of 180°. Thereupon, without interrupting the heating, a solution of 22.4 parts of 2-(N-methyl-piperidyl-2')-1-chloroethane in 20 parts by volume of absolute xylene is added dropwise in the course of 1½ hours, after which the mixture is heated to boiling for three more hours without interrupting the stirring. The mixture is then cooled and excess sodamide is decomposed by the addition of 10 parts of ammonium chloride. The xylene solution is then washed three times with water, using 100 parts by volume each time, after which it is extracted with 250 parts by volume of aqueous tartaric acid of 15% strength. The tartaric acid extract is shaken out with 100 parts by volume of benzene, and is rendered phenol-phthalein-alkaline by the addition of 75 parts by volume of concentrated aqueous caustic soda solution. The resultant oily base separates out and is dissolved in 200 parts by volume of benzene, after which the benzene solution is shaken out with 100 parts by volume of water, then dried over potassium carbonate, filtered and evaporated under reduced pressure. The residue of this evaporation is distilled under reduced pressure (0.01 mm. Hg) and the fraction passing over at 197–199° is collected. The thus-obtained N-[m-n-propylmercapto-phenyl]-N-[2-(N'-methyl-piperidyl-2')-ethyl-1]aniline has, in the analytically pure state, a boiling point of 198° under a pressure of 0.01 mm. Hg.

Upon the addition of isopropanolic hydrochloric acid to a solution, cooled to 0°, of 27.5 parts of the thus-obtained free base in 100 parts by volume of isopropanol, the hydrochloride of the base is precipitated. The hydrochloride is recrystallized from 700 parts by volume of boiling acetone. The analytically pure hydrochloride of N-[m-n-propylmercapto-phenyl]-N-[2-(N'-methyl-piperidyl-2')-ethyl-1]-aniline has a constant melting point of 135–147 (small bubble formation).

*Example 6*

Meta-n-butylmercapto-aniline (boiling point 172–176° under a pressure of 13 mm. Hg) is condensed with the potassium salt of o-chlorobenzoic acid, after which the resultant N-(m-n-butylmercapto-phenyl)-anthranilic acid (melting point 77–79°) is decarboxylated by heating followed by distillation (168–172° under a pressure of 0.01 mm. Hg) to yield N-(m-n-butylmercapto-phenyl)-aniline; melting point 30–32° from petroleum ether (40–60°).

50.0 parts of N-(m-n-butylmercapto-phenyl)-aniline are dissolved in 220 parts by volume of absolute xylene, after which 9.10 parts of finely pulverized sodamide are added to the solution which is then heated to boiling under reflux for 2 hours at a bath temperature of 180°. Thereupon, without interrupting the heating, a solution of 35.4 parts of 2-(N-methylpiperidyl-2')-1-chloroethane in 35 parts by volume of absolute xylene is added dropwise in the course of 1½ hours, after which the mixture is heated to boiling for 3 more hours without interrupting the stirring. The mixture is then cooled and excess sodamide is decomposed by the addition of 15.0 parts of ammonium chloride. The xylene solution is then washed three times with water, using 125 parts by volume each time, after which it is extracted with 400 parts by volume of aqueous tartaric acid of 15% strength. The tartaric acid extracted is shaken out with 150 parts by volume of benzene, and is then rendered phenolphthalein-alkaline by the addition of 100 parts by volume of concentrated aqueous caustic soda solution. The oily base which separates is dissolved in 350 parts by volume of benzene, after which the benzene solution is shaken out with 150 parts by volume of water, then dried over potassium carbonate, filtered and evaporated under reduced pressure. The residue of this evaporation is distilled under reduced pressure (0.01 mm. Hg) and the fraction passing over at 203–205° is collected. The thus-obtained N-[m-n-butylmercapto-phenyl]-N-[2-(N'-methyl-piperidyl-2')-ethyl-1]-aniline has, in the analytically pure state, a tboiling point of 204° under a pressure of 0.01 mm. Hg.

Upon the addition of ethanolic hydrochloric acid to a solution cooled to 0°, of 51.2 parts of the thus-obtained free base in 150 parts by volume of absolute alcohol, the hydrochloride of the base is precipitated. The hydrochloride is again recrystallized from 110 parts by volume of boiling absolute alcohol. The analytically pure hydrochloride of N-[m-n-butylmercapto-phenyl]-N-[2-(N'-methyl-piperidyl-2')-ethyl 1]-aniline has a constant boiling point of 112–114°.

*Example 7*

Meta-n-amyl-nitrobenzene (boiling point 117° at 0.05 mm. Hg) is reduced by means of stannous chloride and hydrochloric acid to yield the m-n-amylmercapto-aniline (boiling point 175° at 11 mm. Hg). The latter is condensed with the potassium salt of o-chlorobenzoic acid, and the resultant N-(m-n-amylmercaptophenyl)-anthranilic acid (melting point 64–66°) is decarboxylated by heating, followed by distillation, whereupon the N-(m-n-amylmercapto-phenyl)-aniline (boiling point 183° at 0.03 mm. Hg) is obtained.

50.0 parts of N-(m-n-amylmercapto-phenyl)-aniline are dissolved in 220 parts by volume of absolute xylene, after which 8.65 parts of finely pulverized sodamide are added to the solution which is then heated to boiling under reflux for 2 hours at a bath temperature of 180°. Thereupon, without interrupting the heating, a solution of 33.5 parts of 2-(N-methyl-piperidyl-2')-1-chloroethane in 35 parts by volume of absolute xylene is added dropwise in the course of 1½ hours, after which the mixture is heated to boiling for 3 more hours without interrupting the stirring. The mixture is then cooled and excess sodamide is decomposed by the addition of 15.0 parts of ammonium chloride. The xylene solution is then washed 3 times with water, using 125 parts by volume each time, after which it is extracted with 400 parts by volume of aqueous tartaric acid of 15% strength. The tartaric acid extract is shaken out with 150 parts by volume of benzene, and is rendered phenolphthalein-alkaline by the addition of 100 parts by volume of concentrated aqueous caustic soda solution. The resultant oily base separates out and is dissolved in 350 parts by volume of benzene, after which the benzene solution is shaken out with 150 parts by volume of water, then dried over potassium carbonate, filtered and evaporated under reduced pressure. The residue of this evaporation is distilled under reduced pressure (0.001 mm. Hg) and the fraction passing over at 205–207° is collected. The thus-obtained N-[m-n-amylmercapto-phenyl]-N-[2-(N'-methyl-piperidyl-2')-ethyl-1]-aniline has, in the analytically pure state, a boiling point of 206° at 0.001 mm. Hg.

*Example 8*

Meta-n-hexylmercapto-nitrobenzene (boiling point 138° under a pressure of 0.06 mm. Hg) is reduced by means of stannous chloride and hydrochloric acid to yield m-n-hexylmercaptoaniline (boiling point 190° at 11 mm. Hg). The latter is condensed with the potassium salt of o-chlorobenzoic acid, and the so-obtained N-(m-n-hexylmercapto-phenyl)-anthranilic acid (melting point 64–66°) is then decarboxylated by heating, followed by distillation, whereupon the N-(m-n-hexylmercapto-phenyl)-aniline (boiling point 180° at 0.01 mm. Hg) is obtained.

50.0 parts of N-(m-n-hexylmercapto-phenyl)-aniline are dissolved in 220 parts by volume of absolute xylene, after which 8.20 parts of finely pulverized sodamide are added to the solution which is then heated to boiling under reflux for 2 hours at a bath temperature of 180°. Thereupon, without interrupting the heating, a solution of 32.0 parts of 2-(N-methylpiperidyl-2')-1-chloroethane in 32 parts by volume of absolute xylene is added dropwise in the course of 1½ hours after which the mixture is heated to boiling for 3 more hours without interrupting the stirring. The mixture is then cooled and excess sodamide is decomposed by the addition of 15.0 parts of ammonium chloride. The xylene solution is then washed, three times with water using 125 parts by volume of water each time, after which it is extracted with 400 parts by volume of aqueous tartaric acid of 15% strength. The tartaric acid extract is shaken out with 150 parts by volume of benzene, and is rendered phenolphthalein-alkaline by the addition of 150 parts by volume of concentrated aqueous caustic soda solution. The resultant oily base, which separates out, is dissolved in 350 parts by volume of benzene, after which the benzene solution is shaken out with 150 parts by volume of water, then dried over potassium carbonate, filtered and evaporated under reduced pressure. The residue of this evaporation is distilled under reduced presure (0.005 mm. Hg), the fraction passing over at 208–210° being collected. The thus-obtained N-[m-n-hexylmercapto-phenyl]-N-[2-(N'-methyl-piperidyl-2')-ethyl-1]-aniline has, in the analytically pure state, a boiling point of 209° under a pressure of 0.005 mm. Hg.

Example 9

Meta-iodo-aniline (boiling point 145–146° under a pressure of 15 mm. Hg) is condensed with the potassium salt of o-chlorobenzoic acid, after which the resultant N-(m-iodo-phenyl)-anthranilic acid (melting point 168–170°) is decarboxylated by heating followed by distillation, whereby N-(m-iodo-phenyl)-aniline (boiling point 140–143°/0.05 mm. Hg) is obtained. The latter is then condensed with sodium thiophenolate in the presence of copper powder to yield N-(m-phenyl-mercapto-phenyl)-aniline (boiling point 176° under a pressure of 0.005 mm. Hg).

30.0 parts of N-(m-phenyl-mercapto-phenyl)-aniline are dissolved in 150 parts by volume of absolute xylene, after which 5.10 parts of finely pulverized sodamide are added to the solution which is then heated to boiling under reflux for two hours at a bath temperature of 180°. Thereupon, without interrupting the heating, a solution of 19.7 parts of 2-(N-methyl-piperidyl-2')-1-chloroethane in 20 parts by volume of absolute xylene is added dropwise in the course of 1½ hours, after which the mixture is heated for three more hours without interrupting the stirring. The mixture is then cooled and excess sodamide is decomposed by the addition of 10 parts of ammonium chloride. The xylene solution is washed three times with water, using 100 parts by volume of water, and is then extracted with 250 parts by volume of aqueous tartaric acid of 15% strength. The tartaric acid extract is shaken out with 100 parts by volume of benzene, and is then rendered phenolphthalein-alkaline by the addition of 75 parts by volume of concentrated aqueous caustic soda solution. The oily base which separates out is dissolved in 200 parts by volume of benzene, after which the benzene solution is shaken out with 100 parts by volume of water, and then dried over potassium carbonate, filtered and evaporated under reduced pressure. The residue of this evaporation is distilled under reduced pressure (0.01 mm. Hg) and the fraction passing over at 217–219° is collected. The so-obtained N-[m-phenyl-mercapto-phenyl]-N-[2-(N'-methyl-piperidyl-2')-ethyl-1]-aniline has, in the analytically pure state, a boiling point of 218° under a pressure of 0.01 mm. Hg.

Upon the addition of ethanolic hydrochloric acid to a solution, cooled to 0°, of the thus-prepared base in 150 parts of absolute alcohol, the hydrochloride of the base precipitates; it is recrystallized from 175 parts by volume of boiling absolute alcohol. The so-obtained hydrochloride of N-[m-phenyl-mercapto-phenyl]-N-[2-(N'-methyl-piperidyl-2')-ethyl-1]-aniline has, in the analytically pure state, a constant melting point of 176–178°, with sintering from 172°.

Example 10

4-chloro-2-amino-phenyl-methyl-sulfide (melting point 29°; boiling point 273–274°) is condensed with the potassium salt of o-chlorobenzoic acid, and the resultant N-(5-chloro-2-methylmercapto-phenyl)-anthranilic acid (melting point 173–175°) then decarboxylated by heating followed by distillation, whereby N-(5-chloro-2-methyl-mercapto-phenyl)-aniline (boiling point 209°/13 mm. Hg) is obtained.

16.40 parts of N-(5-chloro-2-methylmercapto-phenyl)-aniline are dissolved in 65 parts by volume of absolute xylene, after which 3.10 parts of finely pulverized sodamide are added to the solution which is then heated to boiling under reflux for two hours at a bath temperature of 180°. Thereupon, without interrupting the heating, a solution of 12.20 parts of 2-(n-methyl-piperidyl-2')-1-chloroethane in 15 parts by volume of absolute xylene is added dropwise in the course of 1½ hours, the resultant mixture being then heated to boiling for three more hours without discontinuing the stirring. The mixture is then cooled and excess sodamide is decomposed by the addition of 5.0 parts of ammonium chloride. The xylene solution is washed three times with water, using 30 parts by volume each time, after which the xylene solution is extracted with 70 parts by volume of 3-normal acetic acid. The acetic acid extract is shaken out with 50 parts by volume of benzene and is then rendered phenolphthalein-alkaline with 30 parts by volume of concentrated aqueous caustic soda solution. The oily base which precipitates is dissolved in 200 parts by volume of benzene and the benzene solution is shaken out with 100 parts by volume of water, then dried over potassium carbonate, filtered and evaporated under reduced pressure. The so-obtained residue is distilled under reduced pressure (0.015 mm. Hg) and the fraction which distils at 206–208° is collected. The thus-prepared N-[5-chloro-2-methylmercapto-phenyl]-N-[2'-(N'-methyl-piperidyl-2'')-ethyl-1']-aniline has, in the analytically pure state, boiling point of 207° under a pressure of 0.015 mm. Hg.

Example 11

4-chloro-2-nitro-diphenylsulfide (melting point 86°) is reduced with sodium sulfide to the 4-chloro-2-amino-diphenylsulfide (melting point 64–66°). The latter is condensed with the potassium salt of o-chlorobenzoic acid, and the resultant N-(5-chloro-2-phenylmercapto-phenyl)-anthranilic acid (melting point 145–147°) is decarboxylated by heating followed by distillation, whereby N-(5-chloro-2-phenylmercapto-phenyl)-aniline (boiling point 176° under a pressure of 0.01 mm. Hg) is obtained.

19.11 parts of N-(5-chloro-2-phenylmercapto-phenyl)-aniline are dissolved in 100 parts by volume of absolute xylene, after which 2.87 parts of finely pulveribed sodamide is added to the solution and the latter is heated to boiling under reflux for 2 hours at a bath temperature of 180°. Thereupon, without interrupting the heating, a solution of 11.40 parts of 2-(N-methyl-piperidyl-2')-1-chloroethane in 12 parts by volume of absolute xylene is added dropwise, and the mixture heated to boiling for three more hours without interrupting the stirring. The mixture is then cooled and excess sodamide decomposed by the addition of 5.0 parts of ammonium chloride. The xylene solution is washed three times with water, using 30 parts by volume each time, after which the washed xylene solution is extracted with 70 parts by volume of 3-normal acetic acid. The acetic acid extract is shaken out with 50 parts by volume of benzene and is then rendered phenolphthalein-alkaline by the addition of 30 parts by volume of concentrated aqueous caustic soda solution. The oily base which is thus precipitated is dissolved in 200 parts by volume of benzene and the solution then shaken out with 100 parts by volume of water, then dried over potassium carbonate, filtered and evaporated under reduced pressure. The residue of this evaporation is then distilled under reduced pressure (0.02 mm. Hg) and the fraction which passes over at 234–236° is collected. The so-obtained N-[5-chloro-2-phenyl-mercapto-phenyl] - N - [2'-(N'-methyl-piperidyl-2'')-ethyl-1']-aniline has, in the analytically pure state, a boiling point at 235° at a pressure of 0.02 mm. Hg.

The present application is a continuation-in-part of copending application Serial No. 641,011, filed February 19, 1957 (which has been abandoned since the filing of the present application.

Having thus disclosed the invention, what is claimed is:
1. A member selected from the group consisting of compounds of the formula

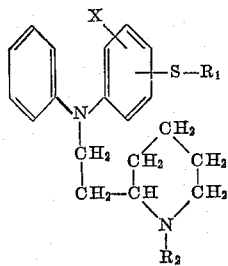

and the physiologically acceptable salts thereof with acids, wherein $R_1$ is a member selected from the group consisting of alkyl with up to 6 carbon atoms, mononuclear carbocyclic aryl and aralkyl, $R_2$ is a member selected from the group consisting of hydrogen and lower alkyl, the —S—$R_1$ group is in one of the positions meta and ortho to the

atom, and X is a member selected from the group consisting of H and Cl.
2. N-[m-methylmercapto-phenyl] - N - [2-(N'-methyl-piperidyl-2')-ethyl-1]-aniline.
3. N-[m-benzylmercapto-phenyl] - N-[2 - (N'-methyl-piperidyl-2')-ethyl-1]-aniline.
4. N-[m-n-butylmercapto-phenyl] - N - [2-(N'-methyl-piperidyl-2')-ethyl-1]-aniline.
5. N-[m-n-amylmercapto-phenyl] - N - [2-(N'-methyl-piperidyl-2')-ethyl-1]-aniline.
6. N-[m-n-hexylmercapto-phenyl] - N - [2-(N'-methyl-piperidyl-2)-ethyl-1]-aniline.
7. N-[m-phenyl-mercapto-phenyl] - N - [2-(N'-methyl-piperidyl-2')-ethyl-1]-aniline.
8. N-[5-chloro-2-phenylmercapto-phenyl] - N - [2'-(N'-methyl-piperidyl-2'')-ethyl-1']-aniline.

No references cited.